US012688590B2

(12) United States Patent
Patravali et al.

(10) Patent No.: US 12,688,590 B2
(45) Date of Patent: Jul. 21, 2026

(54) TECHNIQUES FOR SINGLE-OBJECT TRACKING IN THE REAL WORLD WITH HIERARCHICAL APPEARANCE MODELING AND VERIFICATION

(71) Applicant: Microsoft Technology Licensing, LLC, Redmond, WA (US)

(72) Inventors: Jay Patravali, Bellevue, WA (US); Rishi Madhok, Redmond, WA (US); Nikolaos Karianakis, Redmond, WA (US); Peng Lei, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 18/515,487

(22) Filed: Nov. 21, 2023

(65) Prior Publication Data

US 2025/0166210 A1     May 22, 2025

(51) Int. Cl.
　　*G06T 7/246*　　　(2017.01)
　　*G06T 1/20*　　　(2006.01)
　　(Continued)

(52) U.S. Cl.
　　CPC ............... *G06T 7/248* (2017.01); *G06T 1/20* (2013.01); *G06T 7/11* (2017.01); *G06V 10/761* (2022.01);
　　(Continued)

(58) Field of Classification Search
　　CPC . G06T 7/248; G06T 7/11; G06T 7/246; G06T 1/20; G06T 2207/10016; G06T 2207/20081; G06T 2207/20084; G06V 10/761; G06V 10/764; G06V 10/7715; G06V 10/98; G06V 10/82
　　See application file for complete search history.

(56) References Cited

U.S. PATENT DOCUMENTS

2018/0286259　A1*　10/2018　Ni ........................ A63F 13/5372
2020/0143171　A1*　5/2020　Lee .......................... G06T 7/194
　　(Continued)

OTHER PUBLICATIONS

He et al. SOT for MOT, 2017.*
　　(Continued)

*Primary Examiner* — John B Strege
(74) *Attorney, Agent, or Firm* — NovoTechIP International PLLC

(57)　　　ABSTRACT

A data processing system implements obtaining video content including a target object to be tracked and an object template providing a representation of the target object; analyzing the frames of the video content and the object templates using a single object tracking (SOT) pipeline configured to identify a position of the target object in the frames of the video content, the SOT pipeline outputting a first tracking results; analyzing the frames of the video content using a multiple object tracking (MOT) pipeline that tracks positions of multiple objects in the frames of the video content, the multiple objects including the tracked object and one or more distractor objects, the MOT pipeline outputting second tracking results; comparing the first and second tracking results to determine whether the results are consistent; and tracking the target object using the first tracking results responsive to results being consistent.

18 Claims, 9 Drawing Sheets

(51) Int. Cl.

| | |
|---|---|
| *G06T 7/11* | (2017.01) |
| *G06V 10/74* | (2022.01) |
| *G06V 10/764* | (2022.01) |
| *G06V 10/77* | (2022.01) |
| *G06V 10/98* | (2022.01) |

(52) U.S. Cl.
CPC ........ *G06V 10/764* (2022.01); *G06V 10/7715* (2022.01); *G06V 10/98* (2022.01); *G06T 2207/10016* (2013.01); *G06T 2207/20081* (2013.01)

(56)  References Cited

U.S. PATENT DOCUMENTS

| | | | | |
|---|---|---|---|---|
| 2022/0374526 | A1 * | 11/2022 | Pandey | G06F 21/577 |
| 2024/0303831 | A1 * | 9/2024 | Patsekin | G06T 7/248 |
| 2024/0338830 | A1 * | 10/2024 | Patsekin | G06T 7/248 |

OTHER PUBLICATIONS

Feria, The effects of distractors in multiple object tracking are modulated by the similariyt of distractor and target features, 2012.*

Bhat, et al., "Learning Discriminative Model Prediction for Tracking", In Proceedings of the IEEE/CVF international conference on computer vision, Oct. 27, 2019, pp. 6182-6191.

Cai, et al., "Cascade R-CNN: Delving into High Quality Object Detection", In Proceedings of IEEE Conference on Computer Vision and Pattern Recognition, Jun. 18, 2018, pp. 6154-6162.

He, et al., "FastReID: A Pytorch Toolbox for Real-world Person Re-identification", In Repository of arXiv:2006.02631v4, Jun. 4, 2020, pp. 1-10.

Kalman, R. E, "A New Approach to Linear Filtering and Prediction Problems", In Transactions of the ASME-Journal of Basic Engineering, Mar. 1, 1960, 12 Pages.

Wojke, et al., "Deep Cosine Metric Learning for Person Re-Identification", In Proceedings of IEEE Winter Conference on Applications of Computer Vision, Mar. 12, 2018, 9 Pages.

* cited by examiner

Short-Term Appearance Score ——402

"How similar is target prediction to previous SOT outputs in a short-time frame interval"

Log-Term Appearance Score ——404

"How similar is target prediction to global or human annotated target or first-frame annotation"

500

502 — Initialize hierarchical feature gallery

504 — Initialize tracker on target object

506 — Initialize MOT on first frame with target informatoin

508 — Analyzing the target information with the ReID model

510 — Store ReID features in long-term appearance feature bank

512 — Initalize motion model with target position

600

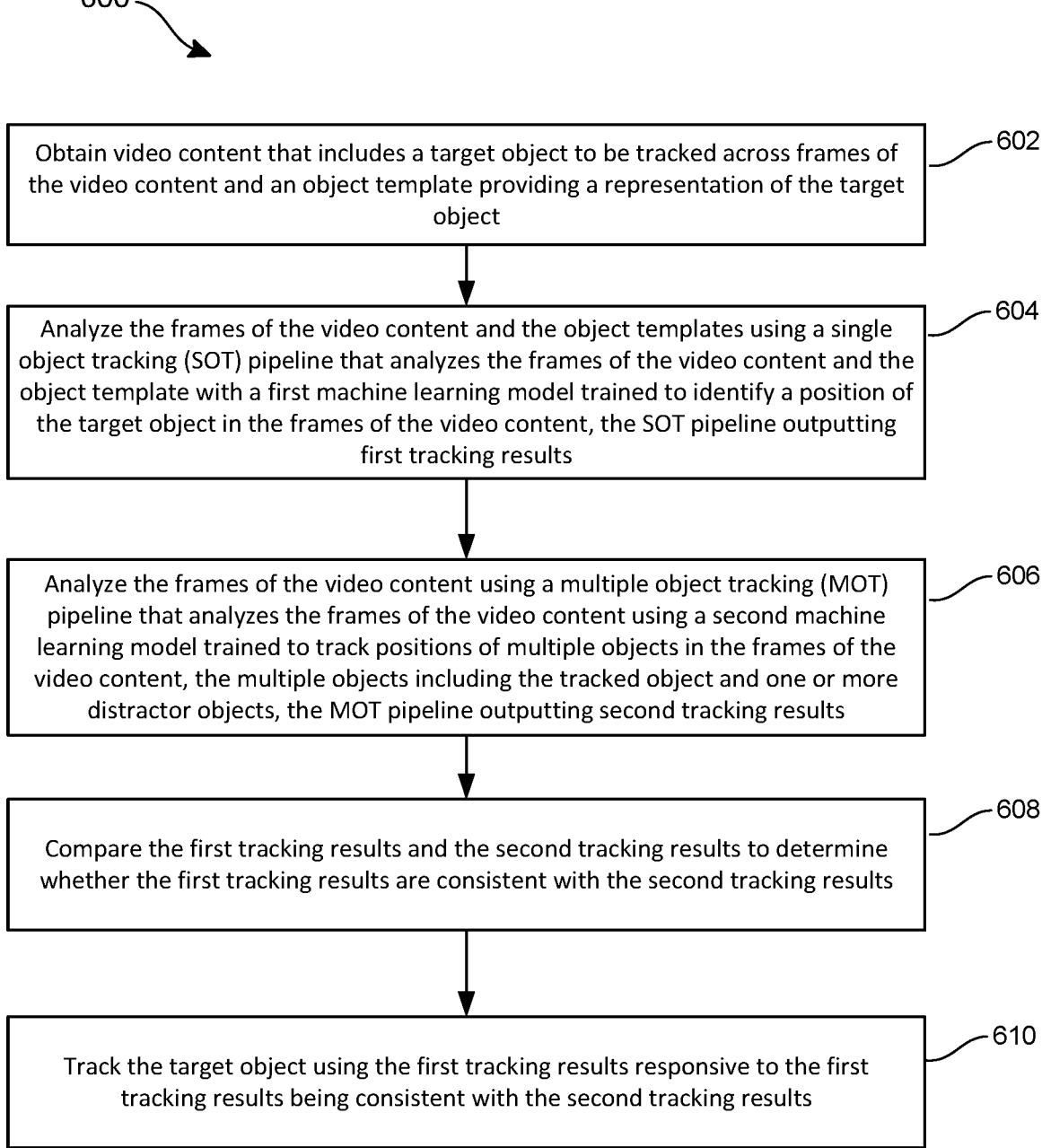

602

Obtain video content that includes a target object to be tracked across frames of the video content and an object template providing a representation of the target object

604

Analyze the frames of the video content and the object templates using a single object tracking (SOT) pipeline that analyzes the frames of the video content and the object template with a first machine learning model trained to identify a position of the target object in the frames of the video content, the SOT pipeline outputting first tracking results

606

Analyze the frames of the video content using a multiple object tracking (MOT) pipeline that analyzes the frames of the video content using a second machine learning model trained to track positions of multiple objects in the frames of the video content, the multiple objects including the tracked object and one or more distractor objects, the MOT pipeline outputting second tracking results

608

Compare the first tracking results and the second tracking results to determine whether the first tracking results are consistent with the second tracking results

610

Track the target object using the first tracking results responsive to the first tracking results being consistent with the second tracking results

FIG. 6A

640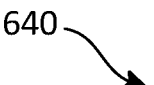

Obtain video content that includes a target object to be tracked across frames of the video content and an object template providing a representation of the target object ⌐642

Analyze the frames of the video content and the object templates using a single object tracking (SOT) pipeline that analyzes the frames of the video content and the object template with a first machine learning model trained to identify a position of the target object in the frames of the video content, the SOT pipeline outputting first tracking results ⌐644

Analyze the frames of the video content using a multiple object tracking (MOT) pipeline that analyzes the frames of the video content using a second machine learning model trained to track positions of multiple objects in the frames of the video content, the multiple objects including the tracked object and one or more distractor objects, the MOT pipeline outputting second tracking results ⌐646

Compare the first tracking results and the second tracking results to determine whether the first tracking results are consistent with the second tracking results ⌐648

Reidentify the tracked object using a hierarchical feature gallery responsive to the first tracking results not being consistent with the second tracking results, wherein the hierarchical feature gallery includes a short-term appearance feature bank that stores images of the tracked object from a predetermined number of most recently processed frames from the frames of the video content, and a long-term appearance feature bank includes all features of the tracked object for all frames of the video content processed while tracking the tracked object ⌐650

FIG. 6B

TECHNIQUES FOR SINGLE-OBJECT TRACKING IN THE REAL WORLD WITH HIERARCHICAL APPEARANCE MODELING AND VERIFICATION

BACKGROUND

With the ubiquitous use of cameras, detecting and tracking objects from videos provides actionable information from a scientific and business point of view. Single Object Tracking (SOT) is an active research area in the field of computer vision. SOT estimates the target position of an object in subsequent frames given the target state of the target object in the first frame of a video sequence in which the target object appears. SOT is widely applicable in many technological use cases such as autonomous driving, human-computer interaction, video surveillance, and augmented reality.

Current SOT techniques can be grouped into two categories: correlation-filter based (CF-based) techniques and deep learning-based (DL-based) techniques. CF-based techniques have been inspired by works in signal processing in which hand-crafted features extracted from the target object are compared based on similarity scores. In contrast, DL-based techniques provide more robust and accurate feature representations. Current DL-based techniques have attempted to address problems such as illumination changes, occlusions, motion blur, scale, and/or changes in appearance of the target object. Deploying these techniques in real-world scenarios has exposed additional challenges, such as abrupt changes in camera viewpoint or camera mode changes. In adverse conditions, the output bounding box from current trackers can be unreliable. Furthermore, current techniques are likely to experience irrecoverable drift when tracking objects in lengthier videos. Hence, there is a need for improved systems and methods that provide a technical solution for implementing accurate and reliable SOT techniques.

SUMMARY

An example data processing system according to the disclosure may include a processor and a machine-readable medium storing executable instructions. The instructions when executed cause the processor alone or in combination with other processors to perform operations including obtaining video content that includes a target object to be tracked across the frames of the video content and an object template providing a representation of the target object; analyzing the frames of the video content and the object templates using a single object tracking (SOT) pipeline that analyzes the frames of the video content and the object template with a first machine learning model trained to identify a position of the target object in the frames of the video content, the SOT pipeline outputting a first tracking results; analyzing the frames of the video content using a multiple object tracking (MOT) pipeline that analyzes the frames of the video content using a second machine learning model trained to track positions of multiple objects in the frames of the video content, the multiple objects including the tracked object and one or more distractor objects, the MOT pipeline outputting second tracking results; comparing the first tracking results and the second tracking results to determine whether the first tracking results are consistent with the second tracking results; and tracking the target object using the first tracking results responsive to the first tracking results being consistent with the second tracking results.

An example method implemented in a data processing system includes obtaining video content that includes a target object to be tracked across the frames of the video content and an object template providing a representation of the target object; analyzing the frames of the video content and the object templates using a single object tracking (SOT) pipeline that analyzes the frames of the video content and the object template with a first machine learning model trained to identify a position of the target object in the frames of the video content, the SOT pipeline outputting a first tracking results; analyzing the frames of the video content using a multiple object tracking (MOT) pipeline that analyzes the frames of the video content using a second machine learning model trained to track positions of multiple objects in the frames of the video content, the multiple objects including the tracked object and one or more distractor objects, the MOT pipeline outputting second tracking results; comparing the first tracking results and the second tracking results to determine whether the first tracking results are consistent with the second tracking results; and tracking the target object using the first tracking results responsive to the first tracking results being consistent with the second tracking results.

An example data processing system according to the disclosure may include a processor and a machine-readable medium storing executable instructions. The instructions when executed cause the processor alone or in combination with other processors to perform operations including obtaining video content that includes a target object to be tracked across the frames of the video content and an object template providing a representation of the target object; analyzing the frames of the video content and the object templates using a single object tracking (SOT) pipeline that analyzes the frames of the video content and the object template with a first machine learning model trained to identify a position of the target object in the frames of the video content, the SOT pipeline outputting a first tracking results; analyzing the frames of the video content using a multiple object tracking (MOT) pipeline that analyzes the frames of the video content using a second machine learning model trained to track positions of multiple objects in the frames of the video content, the multiple objects including the tracked object and one or more distractor objects, the MOT pipeline outputting second tracking results; comparing the first tracking results and the second tracking results to determine whether the first tracking results are consistent with the second tracking results; and reidentifying the tracked object using a hierarchical feature gallery responsive to the first tracking results not being consistent with the second tracking results, wherein the hierarchical feature gallery includes short-term appearance feature bank that stores images of the tracked object from a predetermined number of most recently processed frames from the frames of the video content, and a long-term appearance feature bank includes all features of the tracked object for all frames of the video content processed while tracking the tracked object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 6A is an example flow chart of an example process for single object tracking according to the techniques described herein.

FIG. 6B is an example flow chart of another example process for single object tracking according to the techniques described herein.

DETAILED DESCRIPTION

Techniques for single object tracking in video content are provided herein. These techniques provide a technical solution to the technical problems associated with current SOT techniques that cause these techniques to experience irrecoverable drift. The techniques herein implement a single object tracker (SOT) that outputs tracking information and appearance information for a target object. In addition to the SOT, the techniques herein implement a local multi-object tracker (MOT) and a hierarchical feature gallery. The MOT is run at regular frame intervals to verify the output of the SOT. The local MOT tracks the target object and distractor objects, which are other objects included in the frames of video content that may confuse the SOT. The techniques herein determine whether the overlap between a bounding box denoting the target object output by the SOT and a bounding box denoting the target object output by the MOT exceeds a tunable similarity threshold. The object tracker output is finalized responsive to the overlap in the bounding boxes exceeding the tunable threshold. Otherwise, the techniques herein utilize the hierarchical feature gallery to facilitate automatically redetecting the target object. The hierarchical feature gallery includes a long-term feature gallery and a short-term feature gallery. The short-term feature gallery is used to track the appearance of the target object from frame to frame, while the long-term feature gallery maintains global target appearance information collected across all the frames of video content that have been processed while tracking the tracked object from a first automated frame annotation or intervention by a human annotator. The long-term feature gallery facilitates automatic redetection of the target in response to the target object being occluded in the video content and/or in response to missing tracking information. The techniques herein also implement a linear motion model to predict the location of the target object where there is a disagreement between the SOT and the MOT. The techniques herein also provide means for human-in-the-loop annotations for instances in which the target object is lost for more than a threshold period of time. A technical benefit of the techniques herein is that the MOT and the hierarchical features gallery provide a means for confirming that the SOT is correctly tracking the target object and to automatically correct tracking errors to enable the SOT to track the tracked object for much longer than current SOTs. These and other technical benefits of the techniques disclosed herein will be evident from the discussion of the example implementations that follow.

Figure 1:
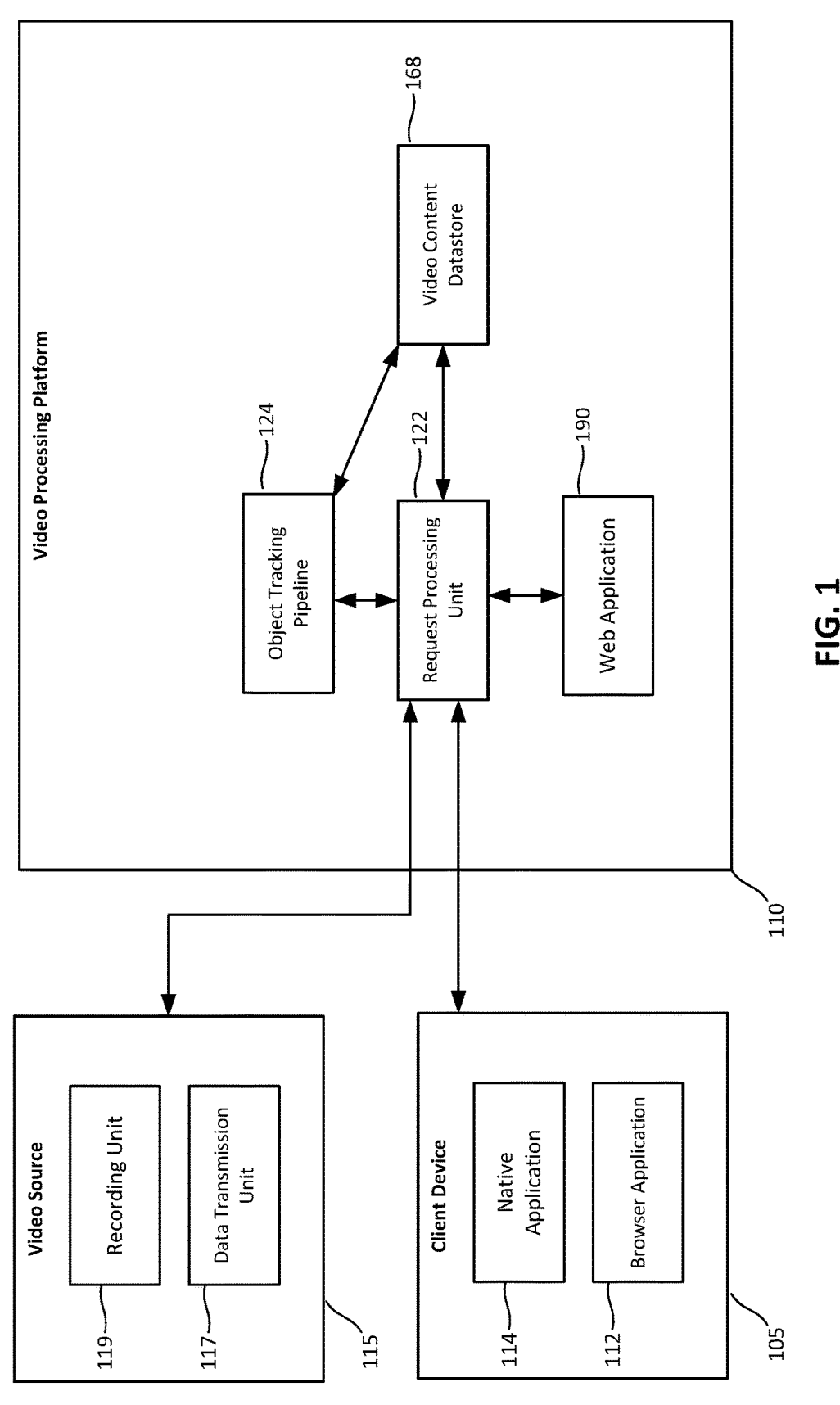
FIG. 1 is a diagram showing an example computing environment in which the techniques disclosed herein for object tracking are implemented.

FIG. 1 is a diagram showing an example computing environment 100 in which the techniques disclosed herein for object tracking may be implemented. The computing environment 100 includes a video processing platform 110. The example computing environment 100 also includes a client device 105. The client device 105 communicates with the video processing platform 110 via a network (not shown). The network connection may be a combination of one or more public and/or private networks and may be implemented at least in part by the Internet.

In the example shown in FIG. 1, the video processing platform 110 is implemented as a cloud-based service or set of services. However, in other implementations, the video processing platform 110 can be implemented on a server of a local network or in an implementation of the client device 105. For example, the video processing platform 110 may be implemented in an autonomous driving system of a vehicle, in a video surveillance system, in an augmented reality device, and/or in other systems that facilitate human-computer interaction.

The video processing platform 110 is configured to receive video content captured by a video source 115. The video source 115 includes a recording unit 119 and a data transmission unit 117. The recording unit 114 is configured to obtain video content from one or more video cameras. The cameras may be part of a video surveillance system that includes cameras distributed across an area to be monitored, such as but not limited to a retail establishment, one or more roadways, a home or other residential building, a business or educational campus, and/or other areas in which tracking of people, vehicles, animals, and/or other objects over a series of frames of video content is needed. The recording unit 119 receives and buffers the video content received from the video cameras in a memory of the video source 119. In some implementations, the recording unit 119 stores a video content in a persistent memory that provides a backup of the video data. The persistent memory is a removable data storage device that can be read by the video processing platform 110. The data transmission unit 117 sends the video content captured by the data transmission unit 117 to the video processing platform 110 via a wired or wireless connection. The video source 115 may be located remotely from the video processing platform 110, and the video source 115 communicates with the video processing platform 110 over a network connection.

The video processing platform 110 implements a request processing unit 122, an object tracking pipeline 124, a video content datastore 168, and a web application 190. The request processing unit 122 is configured to receive content from the video source 115 for storage and/or processing by video processing platform 110. The request processing unit 122 stores the video content in the video content datastore 168. The video content datastore 168 is a persistent datastore in the memory of the video processing platform 110 that enables video content captured by the video source 115 to be accessed by authorized users of the client device 105 and/or for object tracking to be performed on the video content. The video processing platform 110 can perform object tracking on a target object in substantially real time as the video content is received by the video processing platform 110 and/or on a target object in video content that was previously received and stored in the video content datastore 168. The object tracking pipeline 124 analyzes the video content and performs the object tracking. The object tracking pipeline 124 implements the SOT techniques provided herein that utilize the local MOT and hierarchical feature gallery. Additional details of the object tracking pipeline 124 are shown in the examples which follow.

The request processing unit 122 is also configured to receive requests from the native application 114 of the client device 105 and/or the web application 190 of the video processing platform 110. The requests may include but are not limited to requests to view video content captured by the video source 115 and/or track an object in the video content according to the techniques provided herein. The native application 114 and/or the web application 190 provide a user interface that enables the user to access the video content, to track and target object, and to provide human-in-loop annotations for instances in which the target object is lost for more than a threshold period of time.

The client device 105 is a computing device that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes just one client device, other implementations may include a different number of client devices 105 that utilize the video processing platform 110. In some implementations, the video processing platform 110, or at least a portion of the functionality thereof, is implemented by the native application 114 on the client device 105. The client device 105 may be a wearable device or a mobile device that provides an augmented reality experience in which digital context is overlaid onto real-life environments and/or objects captured using a camera of the client device 105 in some implementations. In such implementations, the object tracking techniques provided herein can be used to track the location of one or more real-world objects to facilitate generating of the digital overlays. In yet other implementations, the client device 105 is the navigation system or other computing device of an autonomous or semi-autonomous vehicle to track objects in the environment surrounding the vehicle.

The browser application 112 is an application for accessing and viewing web-based content, the web-based content may be provided by the video processing platform 110. The video processing platform 110 provides the web application 190 that enables users to view video content, track objects in the video content using the techniques herein, and/or annotate the video content in some implementations. A user of the client device 105 may access the web application 190 via the browser application 112, and the browser application 112 renders a user interface for interacting with the video processing platform 110 in the browser application 112.

Figure 2:
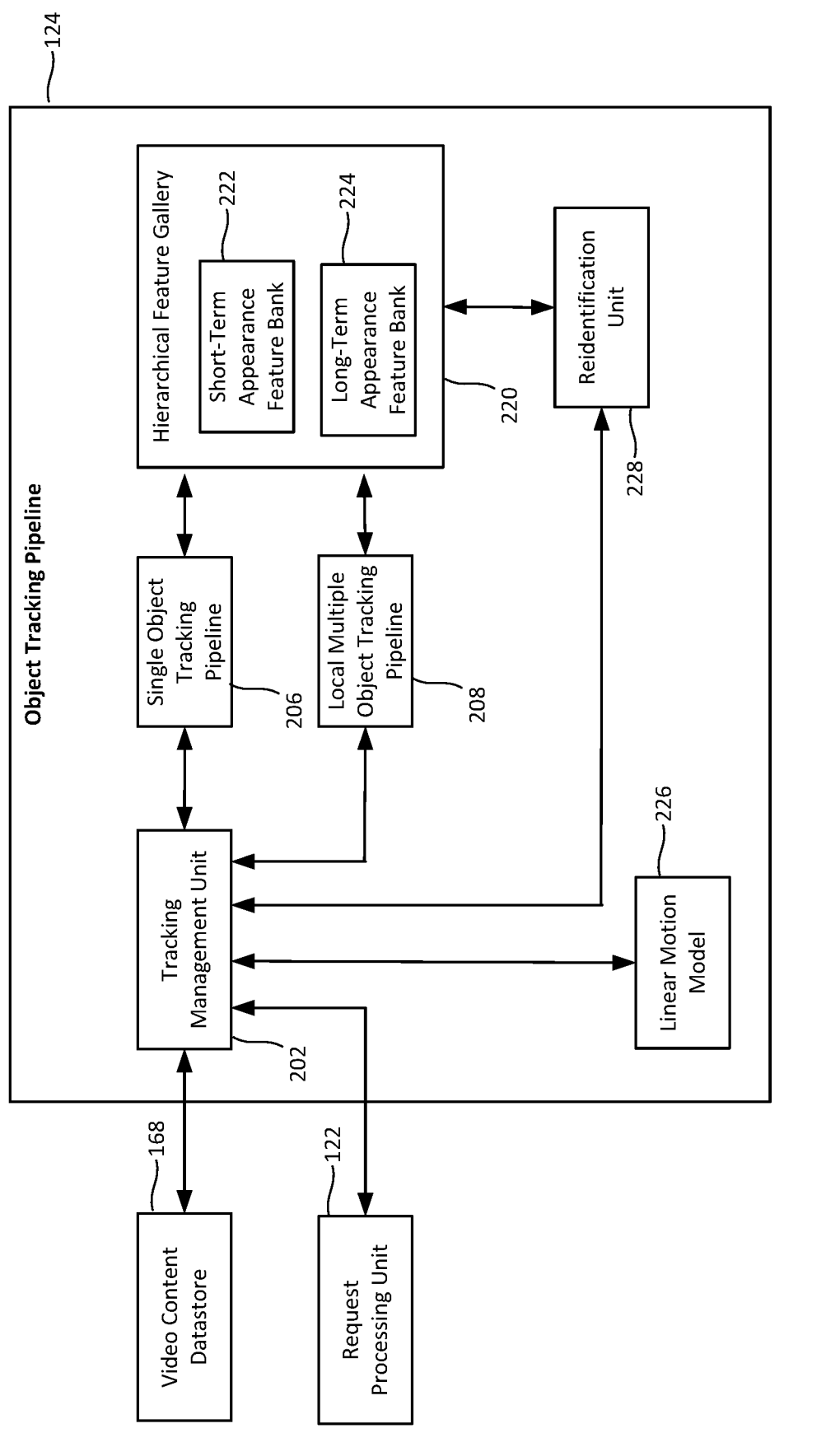
FIG. 2 is a diagram showing an example implementation of the object tracking pipeline shown in FIG. 1
Figure 3:
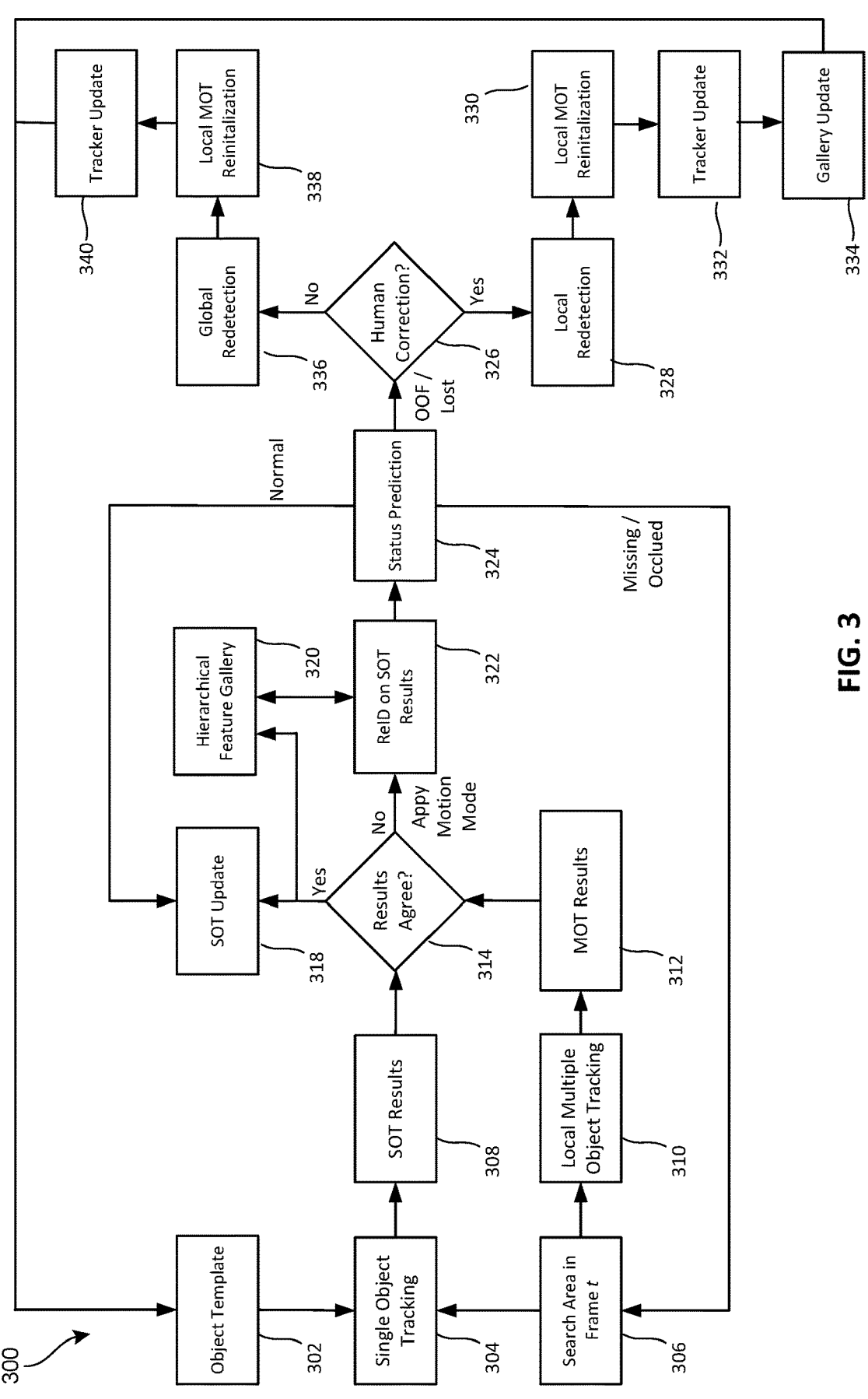
FIG. 3 is a flow diagram of an example process for single object tracking that can be implemented by the object tracking pipeline.

FIG. 2 is a diagram showing an example implementation of the object tracking pipeline 124 shown in FIG. 1. The object tracking pipeline includes a tracking management unit 202, a single object tracking pipeline 206, a local multiple object tracking pipeline 208, a hierarchical feature gallery 220, a linear motion model 226, and a reidentification unit 228. The hierarchical feature gallery 220 includes a short-term appearance feature bank 222 and a long-term appearance feature bank 224. The elements of the object tracking pipeline 124 introduced in FIG. 2 and FIG. 3 provide an example flow diagram in which the object tracking techniques described herein are implemented by the object tracking pipeline 124.

The tracking management unit 202 receives requests to track an object in video content from the request processing unit 122. The request includes information identifying a target object to be tracked and video content in which the target object is to be tracked. The information identifying the target object may include a frame identifier of a frame of the video content that includes the target object and positional information identifying the position of the target object in the frame of the video content. The positional information may be a set of coordinates that represent the position of the target object, a bounding box, or other boundary information indicating the position of the target object in the frame of the video content. The positional information is obtained by the native application 114 and/or the web application 190. The native application 114 and/or the web application 190 provide a user interface that enables a user to select the target object in a frame of the video content. The tracking management unit 202 accesses the video content identified in the request and provides frames of the video content to the single object tracking pipeline 206 and the local multiple object tracking pipeline 208. The video content may be obtained by one or more video sources, such as the video source 115, and provided to the video processing platform. The request processing unit 122 stores the video content in the video content datastore 168. In some implementations, the video content is streamed from the video source 115 in substantially real time and stored in the video content datastore 168, and the object tracking pipeline 124 can track objects in substantially real time.

The single object tracking pipeline 206, also referred to herein as the SOT pipeline 206, implements the SOT tracking of the SOT techniques described herein. The SOT pipeline 206 outputs a bounding box that is predicted to surround the tracked object in a video frame of the video content in which the target object is being tracked. The SOT pipeline 206 performs the SOT determination for each frame of the video content in some implementations. The SOT pipeline 206 can be implemented using various SOT techniques and is not limited to a specific implementation. In a non-limiting example, the SOT pipeline 206 implements a discriminative classifier model to identify the tracked object in the frames of the video content. The discriminative classifier model is based on the discrimination model prediction (DiMP) architecture discussed in "Learning Discriminative Model Prediction for Tracking" by Bhat et al., Proceedings of the IEEE/CVF International Conference on Computer Vision (ICCV), 2019, pp. 6182-6191 in some implementations.

The local multiple object tracking pipeline 208, also referred to herein as the local MOT pipeline 208, tracks multiple objects in the video content, including the target object and one or more distractor objects which may also be present in the frames of video content. The distractor objects are other objects that are present in the frames of video content which are separate from the target object and may be moving independently of the target object. The local MOT pipeline 208 outputs bounding box information for the target object and any distractor objects. The local MOT pipeline 208 can be implemented using various MOT techniques and is not limited to a specific implementation.

In a non-limiting example, the local MOT pipeline 208 implements multiple object tracking using the DeepSORT computer vision tracking algorithm discussed in "Simple Online and Realtime Tracking with a Deep Association Metric" by Wojke et al., 2017 IEEE International Conference on Image Processing (ICIP), September 2017, pp. 3645-3649. In such implementations, the local MOT pipeline 208 implements a two-stage detector based on the Cascade R-CNN. R-CNN as used herein refers to regions with a convolutional neural network. The R-CNN implements a two-stage detection algorithm in which a subset of regions in an image (or frame of video content) are identified that may contain an object to be tracked in the first stage, and the objects are classified in the second stage. The local MOT pipeline 208 implements the Cascade R-CNN with two switchable feature backbones: Resnet-10 which is faster, and Resnet-24 which is more accurate. The MOT detector implemented by the local MOT pipeline 208 is trained using the SOT training data with various augmentations, including but not limited to random cropping, random resizing, random horizontal and vertical flipping, and patch sampling. Patch sampling is unique to the training techniques provided herein. A technical benefit of patch sampling is that the MOT detector provides improved inference results with a search space that is similar to that of the SOT search space of the SOT detector implemented by the SOT pipeline 206. Patch sampling in object detection is a data augmentation technique in which smaller image patches or sub-images are extracted from a larger image to create a dataset for training an object detection model. The objective is to generate training samples that contain both positive examples that contain the objects of interest and negative examples that include background regions without the objects of interest. The positive samples are generated by selecting regions in the training images that contain instances of the target objects and extracting patches centered around the identified target objects from the training images. The negative samples are generated by randomly sampling patches from areas of the training images that do not contain any instances of the target objects and including a diverse variety of backgrounds to ensure that the model can effectively learn to distinguish between objects and their surroundings. A technical benefit of the patch sampling approach is computational efficiency. Working with smaller patches is more efficient, particularly when training deep learning models on large datasets. Another technical benefit is an increased dataset size. Creating multiple patches from a single image effectively increases the size of the training dataset, which can contribute to better generalization of the model. Yet another technical benefit is a focus on relevant information in the training dataset. Extracting patches centered around target objects helps the model to focus on relevant features for detections, thereby reducing the impact of irrelevant background details.

The hyperparameters for the various models utilized by the object tracking pipeline 124 are tuned using a Tree-Structured Parzen Estimator (TPE) algorithm in some implementations. The TPE algorithm is designed to optimize quantization hyperparameters find a quantization configuration that achieves a target accuracy and target latency of the models. The TPE algorithm iteratively evaluates hyperparameters to determine an optimal set of hyperparameters for the models. The TPE algorithm maintains a historical set of hyperparameters that have already been evaluated to facilitate selecting subsequent sets of hyperparameters for testing. A technical benefit of this approach is that the models utilized by the object tracking pipeline 124 are tuned to provide an accuracy and a latency that satisfies the requirements for the particular implementation in which the object tracking pipeline 124 is to be used.

The hierarchical feature gallery 220 is used to settle disagreements between the output of the SOT pipeline 206 and the output of the local MOT pipeline 208. The hierarchical feature gallery 220 includes the short-term appearance feature bank 222 and the long-term appearance feature bank 224 for storing images that represent features of the targeted object over a number of frames of the video content. The short-term appearance feature bank 222 stores the most recent images of the tracked object from a set of most recent frames based on a tunable short-term frame threshold. In a non-limiting example, the short-term frame threshold is the most recent ten frames of the video content, and the images of the tracked object in the short-term appearance feature bank 222 are replaced on a first-in-first out basis as additional frames of the video content are processed by the object tracking pipeline 124. The long-term appearance feature bank 224 stores images of the tracked objected over a longer period of time than the short-term appearance feature bank 222. The long-term appearance feature bank 224 stores images of the most recent frames based on a tunable long-term frame threshold. In some implementations, the long-term feature banks includes all features of the target object collected from the time that tracking of the target object commenced. In a non-limiting example, the long-term frame threshold is the most recent hundred frames of the video content, and the images of the tracked object in the long-term appearance feature bank 224 are replaced on a first-in-first out basis as additional frames of the video content are processed by the object tracking pipeline 124. As will be discussed in greater detail with respect to FIG. 3, the reidentification unit 228 compares image patches from the SOT pipeline 206 with the images included in the short-term appearance feature bank 222 and the long-term appearance feature banks to determine whether to rely on a reidentification of the tracked object based on the comparison of the output of the SOT pipeline 206 or to instead rely on a motion model to predict the position of the tracked object in the video content. In a non-limiting example, the reidentification unit 228 implements the Fast-ReID techniques discussed in "A Pytorch Toolbox for General Instance Reidentification" by He et al., MM '23: Proceedings of the 31st ACM International Conference on Multimedia, October 2023, Pages 9664-9667. The reidentification unit 228 makes a status determination for the tracked object based on the analysis of the SOT results. As discussed in greater detail with respect to FIG. 3, these statuses may include a normal status, a missing/occluded status, and an out-of-frame/lost status. The normal status indicates that the tracked object was correctly identified in the SOT results based on similarity scores output by Fast-ReID. The similarity scores represent a similarity between the portion of the frame in which the SOT results indicates that the tracked object is present and the imagery included in the hierarchical feature gallery 220. Additional details of this comparison are discussed with respect to FIG. 4. The missing/occluded status indicates that the tracked object is predicted to appear in the frame of video being analyzed but is occluded or otherwise not visible. The out-of-frame/lost status indicates that the object is no longer predicted to be within the frame and may require intervention by a human operator to reacquire the target object.

The tracking management unit 202 uses the linear motion model 226 to predict the track of the tracked object when there is a disagreement between the output of the SOT pipeline 206 and the output of the local MOT pipeline 208. The linear motion model 226 outputs a predicted position of the tracked object based on the previous position of the tracked object and the estimated velocity and direction of travel of the tracked object. The tracking management unit 202 replaces the results output by the SOT pipeline 206 with the predicted position of the target object generated by the linear model 226 in response to the SOT and MOT models disagreeing on the position of the target object in the video content. In some implementations, the linear motion model 226 operates in a partial mode in which the positional estimates for the target object output by the single object tracking unit 206 are replaced by the predictions output by the linear motion model 226 for a predetermined number of frames. The tracking management unit 202 then attempts to utilize output of the SOT pipeline 206. In other implementations, the tracking management unit 202 replaces the predictions output by the SOT pipeline 206 with the predictions output by the linear motion model 226. In some implementations, the tracking management unit 202 alerts a human user of the client device 105 to provide an input to identify the tracked object in the video content so that the object tracking pipeline 124 can resume automatically tracking the tracked object using the SOT pipeline 206.

FIG. 3 is a flow diagram of an example process for single object tracking that can be implemented by the object tracking pipeline 124. The process 300 includes an operation 302 of obtaining an object template representing the target object to be tracked. The object template can be obtained from a frame of the video content referenced in a request received by the request processing unit from the native application 114 and/or the web application 190. The object template can be extracted from the frame based on the bounding box or other information included with the request. The process 300 also includes a search area in a specified frame t of the video content in which the target object may be located. The search area may include the entire frame t or a portion thereof. The object template and the search area in frame t are then provided as an input to SOT operation 304 along with frames of the video content, and the SOT pipeline 206 performs single object tracking and outputs SOT results 308 for each frame of the video content. The SOT operation is implemented by the SOT pipeline 206. The SOT results 308 includes information identifying a bounding box around the target object. As discussed in the preceding examples, the SOT pipeline 206 implements DiMP, which utilizes a discriminative classifier to detect and track the target object.

The search area 306 is also provided as an input to the local MOT operation 310, which is performed by the local MOT pipeline 208. The local MOT operation 310 is performed to ensure that the SOT results are consistent and that there are no tracking failures in the presence of distractors. The local MOT operation 310 is not performed for every frame of the video content in some implementations. Instead, the local MOT operation 310 is performed at regular frame intervals. A technical benefit of this approach is that it requires fewer computing resources than executing the local MOT operation 310 for every frame of the video content. Another technical benefit of this approach is that it facilitates real-time, long-term object tracking for longer periods of times than current single object tracking techniques. For example, the techniques herein can provide real-time single object tracking for videos that exceed fifty-five minutes. Current SOT techniques are unable to perform such long-term object tracking due to unrecoverable drift caused by illumination changes, occlusions, motion blur, scale, and/or changes in appearance of the target object over time.

The local MOT operation 310 outputs the MOT results 312 which includes tracking information for the objects detected in the frame of the video content. The MOT results 312 are compared with the SOT results 308 in operation 314 to determine whether the MOT results 312 agree with the SOT results 308. The operation 314 is implemented by the tracking management unit 202 of the object tracking pipeline 124. The tracking management unit 202 compares the bounding box of the tracked object in the SOT results 308 with the bounding box of the tracked object in the MOT results 312. The tracking management unit 202 determines an overlap of the two bounding boxes. The tracking management unit 202 determines whether the overlap satisfies a similarity threshold. If the threshold is satisfied, the tracking management unit 202 utilizes the SOT results 308 for tracking the target object. The tracking management unit 202 updates the short-term appearance feature bank 222 and the long-term appearance feature bank 224 of the hierarchical feature gallery 220 with the object template 302. The object tracking pipeline 124 also updates the position of the tracked object based on the SOT results 308 in operation 318. The process 300 may then continue with a next frame of the video content with operation 306 providing the next frame of the video content or a portion thereof as an input to the SOT operation 304 and the MOT operation 310.

Figure 4:
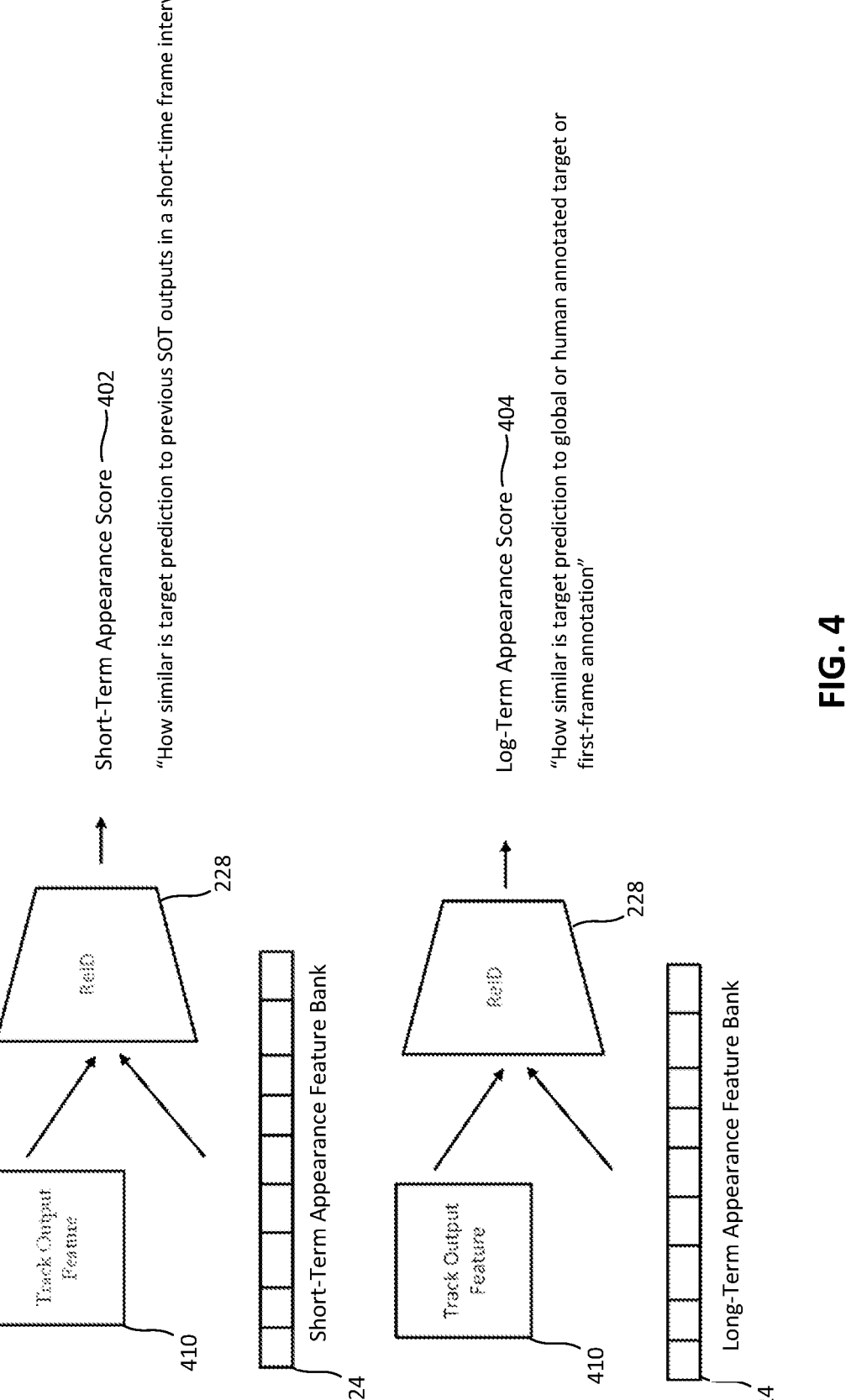
FIG. 4 is a diagram showing an example of a reidentification process that may be performed by the object tracking pipeline.

If the tracking management unit 202 determines that the bounding boxes output by the SOT operation 304 and the local MOT operation 310 are too dissimilar, the process 300 continues with operation 322. The tracking management unit 202 replaces the SOT results 308 with the output of the linear motion model 226 and executes a reidentification operation 322 on the SOT results 308. The reidentification operation 322 compares the image of the target object included in the SOT results 308 with feature banks of the hierarchical feature gallery 320, and status prediction operation 324 includes analyzing the similarity scores output from the reidentification process to determine a status for the target object. In a non-limiting example, these statuses include a normal status, a missing/occluded statues, and an out-of-frame/lost status. Additional details of the reidentification operation 322 are shown in FIG. 4. In response to a normal status, the process 300 continues to operation 318 in which the position of the tracked object is updated based on the SOT results 308. In response to a missing/occluded status, the process returns to operation 306 in which the next frame of the video content is analyzed to attempt to determine a position of the tracked object. In response to the out-of-frame/lost status, the process 300 continues with operation 326 in which a determination is made on whether human-in-the-loop annotations can be acquired. The tracking management unit 202 of the object tracking pipeline 124 can send a request to the request processing unit 122 to prompt a user of the native application 114 and/or the web application 190 to provide an input providing positional information for tracked object in a frame of video content. The positional information may be a set of coordinates that represent the position of the target object, a bounding box, or other boundary information indicating the position of the target object in the frame of the video content.

Responsive to receiving the human input in operation 326, the process 300 continues with operation 328 in which a local redetection is performed based on the positional information provided by the human user. The local MOT pipeline 208 then performs a reinitialization operation 330 to cause the local MOT pipeline 208 to detect objects in the current frame of the video content. The process 300 then continues with a tracker update operation 332 in which the bounding box information for the tracked object maintained by the tracking management unit 202 of the object tracking pipeline 124 is updated. The process 300 then continues with a gallery update operation 334 in which the short-term appearance feature bank 222 and the long-term appearance feature bank 224 of the hierarchical feature gallery 220 are updated with the current images of the tracked object extracted from the current video frame.

Responsive to not receiving the human input in operation 326, the process 300 continues with the operation 336 in which a global redetection operation 336 is performed. In the global redetection operation, the tracking management unit 202 attempt to redetect the tracked object in response to the tracked object being missing or lost for more than a fixed number of frames before reinitializing the tracker in operation 332. The global redetection operation includes using the local MOT pipeline 208 to detect all the objects in a current frame of the video content. The reidentification unit 228 is then used to generate features of each of the candidate objects detected in the current frame. These features are then compared with the historical features of the target object in the hierarchical feature gallery 220 and ranked according to their similarity score. The reidentification unit 228 also compares the bounding box of the candidate object having the highest ranked candidate object with short-term and long-term appearance similarity thresholds to ensure that the selected candidate object also satisfies these thresholds. If the highest ranked candidate object does not satisfy these thresholds, the next highest ranked candidate object is considered. Otherwise, if the candidate object satisfies these thresholds, the local MOT object tracking pipeline 208 is reinitialized with the bounding box of the selected candidate object in operation 338, and the SOT tracking pipeline 206 is also updated with the bounding box the selected candidate object in operation 340.

FIG. 4 is a diagram showing an example of a reidentification process that may be performed by the reidentification unit 228 of the object tracking pipeline 124. The reidentification unit 228 compares the features of the tracked object 410 with the contents of the short-term appearance feature bank 222 to determine a short-term appearance score 402. The reidentification unit 228 compares the features of the tracked objected 410 with the contents of the long-term appearance feature bank 224 to calculate the long-term appearance score 404. The features of the tracked object 410 are the SOT results 308 output by the SOT pipeline 206 in some implementations. The short-term appearance score 402 represents a similarity between the predicted target object from the SOT results 308 and the previous SOT outputs in the short-term appearance feature bank 222. The long-term appearance score 404 represents a similarity between the predicted target from the SOT results 308 and the global or human annotated target or first-frame annotation. The reidentification unit 228 determines a status for the targeted object based on the similarity scores 402 and 404. In some implementations, each status is associated with a range of non-overlapping similarity scores 402 and 404, and the reidentification unit 228 implements the status prediction operation 324 shown in FIG. 3 by determining a status based on the similarity scores 402 and 404 output by the reidentification operation 322.

Figure 5:
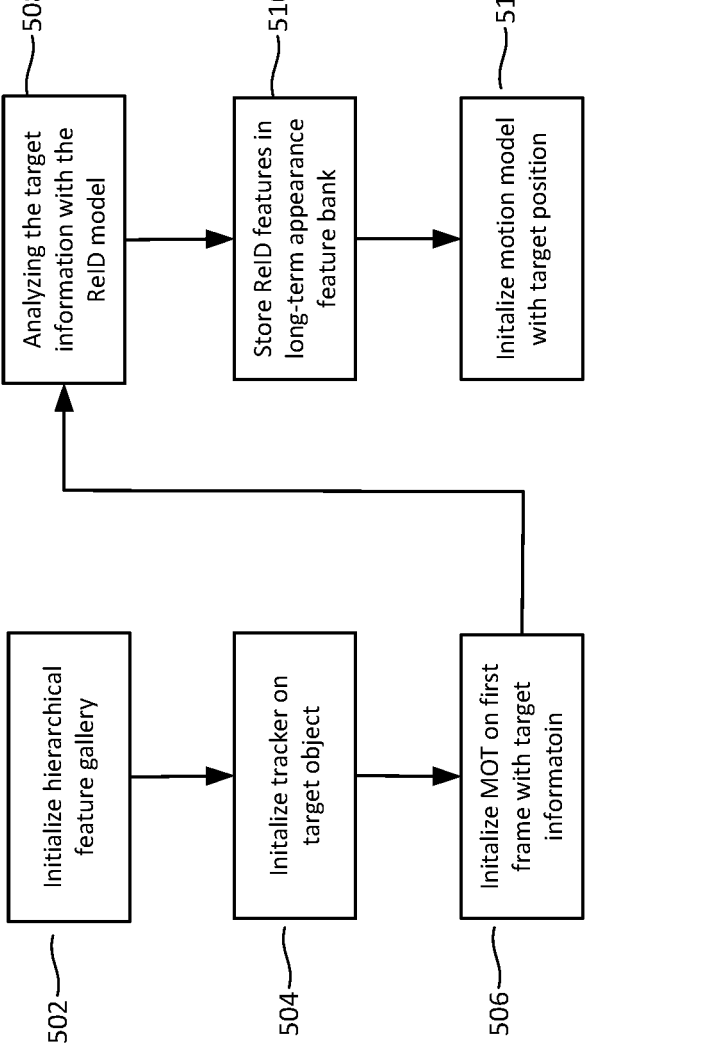
FIG. 5 is a flow diagram of an example process for initializing the object tracking pipeline shown in FIG. 1.

FIG. 5 is a flow diagram of an example process 500 for initializing the object tracking pipeline 124. The process 500 can be performed by the object tracking pipeline 124 at the first frame of video content in which the tracked object is to be tracked. The process 500 includes an operation 502 of initializing the hierarchical feature gallery 220. The tracking management unit 202 allocates memory for the short-term appearance feature bank 222 and the long-term appearance feature bank 224 in a memory of the video processing platform 110. The process 500 includes an operation 504 of initializing the object tracking pipeline 124 on the target object. As discussed in the preceding examples, positional information for the target object that represents the position of the target object in an initial frame of video content can be obtained from native application 114 and/or the web application 190. The process 500 includes an operation 506 in which the local MOT pipeline 208 is initiated with the target information on the first frame of the video content. The process 500 also includes an operation 508 of analyzing the target information with the ReID model of the reidentification unit 228 to obtain feature information that can be used to populate the long-term appearance feature bank 224, and an operation of populating the long-term appearance feature bank 224 using the feature information output by the ReID model. The process 500 also includes an operation of initializing the linear motion model 226 with the target position information of the target object obtained in the preceding operations.

FIG. 6A is an example flow chart of an example process 600 for single object tracking according to the techniques described herein. The process 600 can be implemented on the video processing platform 110.

The process 600 includes an operation 602 of obtaining video content that includes a target object to be tracked across the frames of the video content and an object template providing a representation of the target object. The tracking management unit 202 of the object tracking pipeline 124 accesses the video content from the video content datastore 168 in response to a request from the request processing unit 122 to track an object in the video content. The object template is a portion of a frame of the video content that includes the object to be tracked. The object template may be determined based on a bounding box or other positional information received from the native application 114 and/or the web application 190 in which a user has drawn a bounding box around the target object and/or otherwise designated the targeted object. The object template can be updated in response to the targeted object being lost or out of frame as discussed with respect to FIG. 3.

The process 600 includes an operation 604 of analyzing the frames of the video content and the object templates using a single object tracking (SOT) pipeline that analyzes the frames of the video content and the object template with a first machine learning model trained to identify a position of the target object in the frames of the video content, the SOT pipeline outputting first tracking results. The SOT pipeline 206 analyzes the frames of the video and the template and outputs SOT results 308 that provide a bounding box around the tracked object in the frames of the video content.

The process 600 includes an operation 606 of analyzing the frames of the video content using a multiple object tracking (MOT) pipeline 208 that analyzes the frames of the video content using a second machine learning model trained to track positions of multiple objects in the frames of the video content. The multiple objects including the tracked object and one or more distractor objects. The local MOT pipeline 208 outputs second tracking results that include bounding boxes around the tracked object and the one or more distractor objects. The MOT pipeline 208 tracks all detected objects in the frames of the video content rather than a specific tracked object like the SOT pipeline 206.

The process 600 includes an operation 608 of comparing the first tracking results and the second tracking results to determine whether the first tracking results are consistent with the second tracking results. As discussed in the preceding examples, the tracking management unit 202 of the object tracking pipeline 124 compares the SOT results 308 and the MOT results 312 to determine whether the SOT results 308 are consistent with the MOT results 312. The MOT results 312 are referred to as local results because they are determined over a small subset of recent frames of the video content. In some implementations, SOT results 308 include a bounding box around the target object and the MOT results 312 include bounding boxes around the target object and any distractor objects. The bounding boxes associated with the target object are compared to determine whether the bounding boxes overlap sufficiently to satisfy a similarity threshold, which indicates that the SOT results 308 output by the SOT pipeline 206 are consistent with the MOT results 312 output by the local MOT pipeline 208. A technical benefit of this approach is that the object tracking pipeline 124 can quickly detect when the SOT pipeline 206 is experiencing difficulties in tracking the tracked object.

The process 600 includes an operation 610 of tracking the target object using the first tracking results responsive to the first tracking results being consistent with the second tracking results. The object tracking pipeline 124 adopts the SOT results 308 and can utilize this information to perform various actions on behalf of various components of the video processing platform 110, the native application 114, and/or the web application 190. These actions may include presenting a visualization of the tracked object in the video content on a user interface of the native application 114 and/or the web application 190 and/or generating other content based on the SOT results 308. In a non-limiting example, the client device 105 is a wearable device or a mobile device that provides an augmented reality experience in which digital content is overlaid onto real-life environments and objects captured using a camera of the client device 105. In such implementations, the object tracking techniques provided herein can be used to track the location of one or more real-world objects to facilitate generating of the digital overlays. Other implementations utilize the object tracking techniques herein in an autonomous or semi-autonomous vehicle to track objects in the environment surrounding the vehicle. Other implementations utilize the SOT results 308 for various video surveillance and/or human-computer interaction applications.

FIG. 6B is an example flow chart of another example process 640 for single object tracking according to the techniques described herein. The process 640 can be implemented by the video processing platform 110.

The process 640 includes an operation 642 of obtaining video content that includes a target object to be tracked across the frames of the video content and an object template providing a representation of the target object. The tracking management unit 202 of the object tracking pipeline 124 accesses the video content from the video content datastore 168 in response to a request from the request processing unit 122 to track an object in the video content. The object template is a portion of a frame of the video content that includes the object to be tracked. The object template may be determined based on a bounding box or other positional information received from the native application 114 and/or the web application 190 in which a user has drawn a bounding box around the target object and/or otherwise designated the targeted object. The object template can be updated in response to the targeted object being lost or out of frame as discussed with respect to FIG. 3.

The process 640 includes an operation 644 of analyzing the frames of the video content and the object templates using a single object tracking (SOT) pipeline that analyzes the frames of the video content and the object template with a first machine learning model trained to identify a position of the target object in the frames of the video content, the SOT pipeline outputting first tracking results. The SOT pipeline 206 analyzes the frames of the video and the template and outputs SOT results 308 that provide a bounding box around the tracked object in the frames of the video content.

The process 640 includes an operation 646 of analyzing the frames of the video content using a multiple object tracking (MOT) pipeline 208 that analyzes the frames of the video content using a second machine learning model trained to track positions of multiple objects in the frames of the video content. The multiple objects including the tracked object and one or more distractor objects. The local MOT pipeline 208 outputs second tracking results that include bounding boxes around the tracked object and the one or more distractor objects. The MOT pipeline 208 tracks all detected objects in the frames of the video content rather than a specific tracked object like the SOT pipeline 206.

The process 640 includes an operation 648 of comparing the first tracking results and the second tracking results to determine whether the first tracking results are consistent with the second tracking results. As discussed in the preceding examples, the tracking management unit 202 of the object tracking pipeline 124 compare the SOT results 308 and the MOT results 312 to determine whether the SOT results 308 are consistent with the MOT results 312. The MOT results 312 are referred to as local results because they are determined over a small subset of recent frames of the video content. In some implementations, SOT results 308 include a bounding box around the target object and the MOT results 312 include bounding boxes around the target object and any distractor objects. The bounding boxes associated with the target object are compared to determine whether the bounding boxes overlap sufficiently to satisfy a similarity threshold, which indicates that the SOT results 308 output by the SOT pipeline 206 are consistent with the MOT results 312 output by the local MOT pipeline 208. A technical benefit of this approach is that the object tracking pipeline 124 can quickly detect when the SOT pipeline 206 is experiencing difficulties in tracking the tracked object.

The process 640 includes an operation 650 of reidentifying the tracked object using a hierarchical feature gallery 220 responsive to the first tracking results not being consistent with the second tracking results. The hierarchical feature gallery 220 includes a short-term appearance feature bank that stores images of the tracked object from a predetermined number of most recently processed frames from the frames of the video content, and a long-term appearance feature bank that includes all features of the tracked object for all frames of the video content processed while tracking the tracked object. The reidentification unit 228 discussed in the preceding examples implements the operation 650 to reidentify the target object in the video content.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
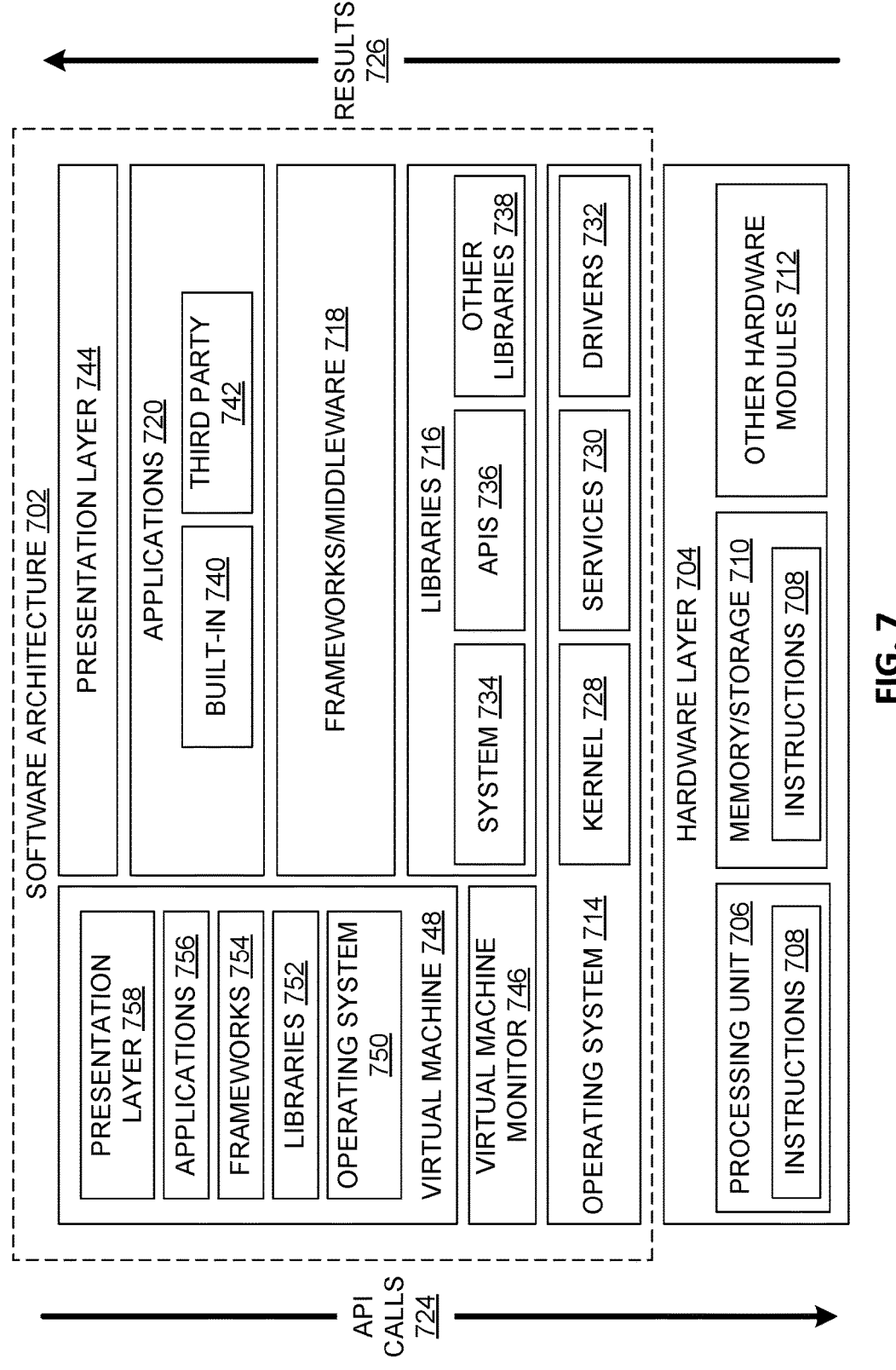
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
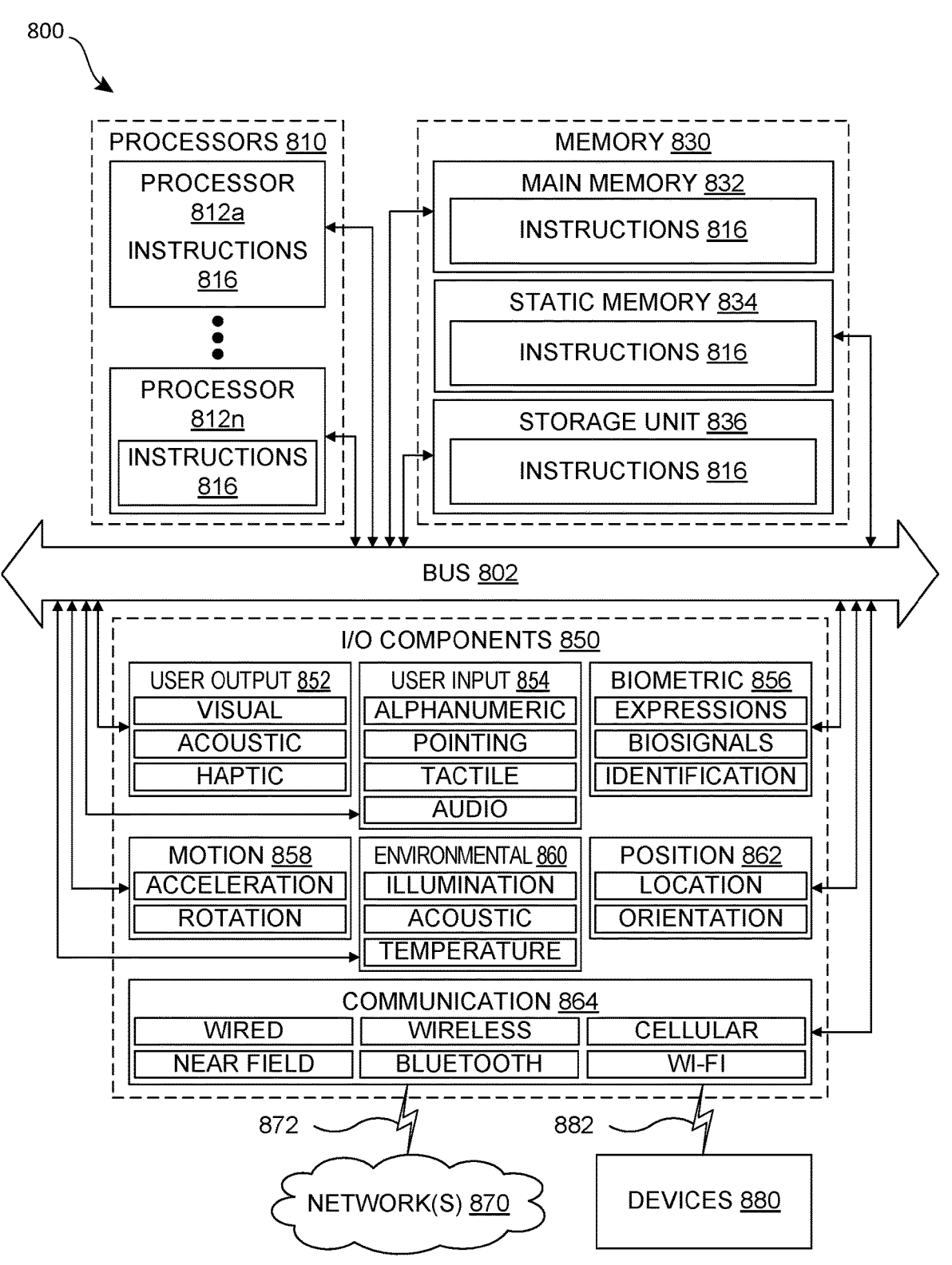
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components

862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor alone or in combination with other processors to perform operations comprising:
   obtaining video content that includes a target object to be tracked across frames of the video content and an object template providing a representation of the target object;
   analyzing the frames of the video content and the object template using a single object tracking (SOT) pipeline that analyzes the frames of the video content and the object template with a first machine learning model trained to identify a position of the target object in the frames of the video content, the SOT pipeline outputting first tracking results comprising a first bounding box associated with the target object;
   analyzing the frames of the video content using a multiple object tracking (MOT) pipeline that analyzes the frames of the video content using a second machine learning model trained to track positions of multiple objects in the frames of the video content, the multiple objects including the target object and one or more distractor objects, the MOT pipeline outputting second tracking results comprising a second bounding box associated with the target object;
   comparing the first tracking results and the second tracking results to determine whether the first tracking results are consistent with the second tracking results by:
      comparing the first bounding box with the second bounding box to determine an overlap between the first bounding box and the second bounding box; and
      determining that the first tracking results are consistent with the second tracking results responsive to the overlap between the first bounding box and the second bounding box satisfying a similarity threshold; and
   tracking the target object using the first tracking results responsive to the first tracking results being consistent with the second tracking results.

2. The data processing system of claim 1, wherein the first machine learning model is a discriminative classifier model.

3. The data processing system of claim 1, wherein the second machine learning model is implementing using a DeepSORT architecture.

4. The data processing system of claim 1, wherein the machine-readable medium further includes instructions configured to cause the processor alone or in combination with other processors to perform operations of:

obtaining a user annotation on a from a frame of the video content identifying the target object; and extracting the object template from the frame of the video content.

5. A data processing system comprising:

a processor; and a machine-readable medium storing executable instructions that, when executed, cause the processor alone or in combination with other processors to perform operations comprising:

obtaining video content that includes a target object to be tracked across frames of the video content and an object template providing a representation of the target object;

analyzing the frames of the video content and the object template using a single object tracking (SOT) pipeline that analyzes the frames of the video content and the object template with a first machine learning model trained to identify a position of the target object in the frames of the video content, the SOT pipeline outputting a first tracking results;

analyzing the frames of the video content using a multiple object tracking (MOT) pipeline that analyzes the frames of the video content using a second machine learning model trained to track positions of multiple objects in the frames of the video content, the multiple objects including the target object and one or more distractor objects, the MOT pipeline outputting second tracking results;

comparing the first tracking results and the second tracking results to determine whether the first tracking results are consistent with the second tracking results;

tracking the target object using the first tracking results responsive to the first tracking results being consistent with the second tracking results; and tracking the target object using a linear motion model responsive to the first tracking results not being consistent with the second tracking results.

6. The data processing system of claim 5, wherein the machine-readable medium further includes instructions configured to cause the processor alone or in combination with other processors to perform operations of:

performing a reidentification operation responsive to the first tracking results not being consistent with the second tracking results.

7. The data processing system of claim 6, wherein performing the reidentification operation responsive to the first tracking results not being consistent with the second tracking results further comprises:

comparing features of the target object from the first tracking results with previously captured features of the target object stored in a hierarchical feature gallery to determine a similarity score representing a similarity between the target object from the first tracking results and previously captured features of the target object; and determining a status of the target object based on the similarity score.

8. The data processing system of claim 7, wherein the hierarchical feature gallery includes a short-term appearance feature bank that stores images of the target object from a predetermined number of most recently processed frames from the frames of the video content, and a long-term appearance feature bank that includes all features of the target object for all frames of the video content processed while tracking the target object.

9. The data processing system of claim 7, wherein the machine-readable medium further includes instructions configured to cause the processor alone or in combination with other processors to perform operations of:

analyzing a next frame of the frames of the video content to track the target object responsive to the status indicating that the target object is missing or occluded.

10. The data processing system of claim 7, wherein the machine-readable medium further includes instructions configured to cause the processor alone or in combination with other processors to perform operations of:

tracking the target object using the first tracking results responsive to the status indicating that the first tracking results are correct.

11. The data processing system of claim 7, wherein the machine-readable medium further includes instructions configured to cause the processor alone or in combination with other processors to perform operations of:

analyzing a next frame of the frames of the video content to track the target object responsive to the status indicating that the target object is lost.

12. A method implemented in a data processing system for tracking objects in video content, the method comprising:

obtaining video content that includes a target object to be tracked across frames of the video content and an object template providing a representation of the target object;

analyzing the frames of the video content and the object template using a single object tracking (SOT) pipeline that analyzes the frames of the video content and the object template with a first machine learning model trained to identify a position of the target object in the frames of the video content, the SOT pipeline outputting a first tracking results comprising a first bounding box associated with the target object;

analyzing the frames of the video content using a multiple object tracking (MOT) pipeline that analyzes the frames of the video content using a second machine learning model trained to track positions of multiple objects in the frames of the video content, the multiple objects including the target object and one or more distractor objects, the MOT pipeline outputting second tracking results comprising a second bounding box associated with the target object;

comparing the first tracking results and the second tracking results to determine whether the first tracking results are consistent with the second tracking results by:

comparing the first bounding box with the second bounding box to determine an overlap between the first bounding box and the second bounding box; and determining that the first tracking results are consistent with the second tracking results responsive to the overlap between the first bounding box and the second bounding box satisfying a similarity threshold; and tracking the target object using the first tracking results responsive to the first tracking results being consistent with the second tracking results.

13. The method of claim 12, wherein the first machine learning model is a discriminative classifier model.

14. The method of claim 12, wherein the second machine learning model is implementing using a DeepSORT architecture.

15. The data processing system of claim 1, wherein the machine-readable medium further includes instructions configured to cause the processor alone or in combination with other processors to perform operations of:

obtaining a user annotation on a from a frame of the video content identifying the target object; and extracting the object template from the frame of the video content.

16. A data processing system comprising:

a processor; and a machine-readable medium storing executable instructions that, when executed, cause the processor alone or in combination with other processors to perform operations comprising:

obtaining video content that includes a target object to be tracked across frames of the video content and an object template providing a representation of the target object;

analyzing the frames of the video content and the object template using a single object tracking (SOT) pipeline that analyzes the frames of the video content and the object template with a first machine learning model trained to identify a position of the target object in the frames of the video content, the SOT pipeline outputting a first tracking results;

analyzing the frames of the video content using a multiple object tracking (MOT) pipeline that analyzes the frames of the video content using a second machine learning model trained to track positions of multiple objects in the frames of the video content, the multiple objects including the target object and one or more distractor objects, the MOT pipeline outputting second tracking results;

comparing the first tracking results and the second tracking results to determine whether the first tracking results are consistent with the second tracking results; and reidentifying the target object using a hierarchical feature gallery responsive to the first tracking results not being consistent with the second tracking results, wherein the hierarchical feature gallery includes short-term appearance feature bank that stores images of the target object from a predetermined number of most recently processed frames from the frames of the video content, and a long-term appearance feature bank that includes all features of the target object for all frames of the video content processed while tracking the target object.

17. The data processing system of claim 16, wherein the first tracking results include a first bounding box associated with the target object, wherein the second tracking results include a second bounding box associated with the target object, and wherein comparing the first tracking results and the second tracking results to determine whether the first tracking results are consistent with the second tracking results further comprises:

comparing the first bounding box with the second bounding box to determine an overlap between the first bounding box and the second bounding box; and determining that the first tracking results are consistent with the second tracking results responsive to the overlap between the first bounding box and the second bounding box satisfying a similarity threshold.

18. The data processing system of claim 16, wherein the machine-readable medium further includes instructions configured to cause the processor alone or in combination with other processors to perform operations of:

obtaining a user annotation on a frame of the frames of the video content identifying the target object; and extracting the object template from the frame of the video content.

\*　\*　\*　\*　\*